United States Patent
Tietz et al.

(10) Patent No.: US 7,407,717 B2
(45) Date of Patent: Aug. 5, 2008

(54) PROTECTIVE COATING FOR SUBSTRATES THAT ARE SUBJECTED TO HIGH TEMPERATURES AND METHOD FOR PRODUCING SAID COATING

(75) Inventors: Frank Tietz, Jülich (DE); Mohsine Zahid, Jülich (DE); Willem J. Quadakkers, Wijnandsrade (NL); Vladimir Shemet, Jülich (DE)

(73) Assignee: Forschungzentrum Julich GmbH, Julich (DE)

( * ) Notice: Subject to any disclaimer, the term of this patent is extended or adjusted under 35 U.S.C. 154(b) by 314 days.

(21) Appl. No.: 10/545,886

(22) PCT Filed: Jan. 13, 2004

(86) PCT No.: PCT/DE2004/000024

§ 371 (c)(1),
(2), (4) Date: Aug. 15, 2005

(87) PCT Pub. No.: WO2004/075323

PCT Pub. Date: Sep. 2, 2004

(65) Prior Publication Data
US 2006/0099442 A1 May 11, 2006

(30) Foreign Application Priority Data
Feb. 18, 2003 (DE) .............................. 103 06 649

(51) Int. Cl.
*H01M 2/00* (2006.01)

(52) U.S. Cl. .................... 428/701; 429/30; 429/34; 429/38; 429/39; 428/469; 428/702; 427/115; 427/126.3; 427/126.6; 427/419.2; 427/419.3

(58) Field of Classification Search ............... 429/30, 429/34, 38, 39; 428/469, 701, 702; 427/115, 427/126.3, 126.6, 419.2, 419.3
See application file for complete search history.

(56) References Cited
U.S. PATENT DOCUMENTS
5,942,349 A * 8/1999 Badwal et al. ............... 429/34

(Continued)

FOREIGN PATENT DOCUMENTS
DE 100 50 010 4/2002
WO WO 96/28855 9/1996
WO WO 97/04494 2/1997

OTHER PUBLICATIONS
English translation of DE10050010 A1 to Frank Tietz, Apr. 18, 2002.*

Primary Examiner—John J. Zimmerman
Assistant Examiner—Aaron Austin
(74) Attorney, Agent, or Firm—Jonathan Myers; Andrew Wilford

(57) ABSTRACT

A method is disclosed for producing a protective coating on a chromium oxide-forming substrate, which comprises the steps of:
(a) applying on the chromium-oxide-forming substrate having at least one alloying addition selected from the group consisting of manganese, magnesium, and vanadium, a coating consisting essentially of at least one spinel-forming element selected from the group consisting of cobalt, nickel, copper and vanadium,
(b) forming a chromium oxide layer at the substrate/applied coating interface, and
(c) at a temperature of 500° C. to 1000° C. causing the diffusion of the at least one alloying addition through the chromium oxide layer and forming a compound thereof with the at least one spinel-forming element diffusing from the applied coating and forming between the chromium oxide layer on the substrate and the applied coating, a uniform, compact, adherent chromium-free gas-tight spinel layer.

13 Claims, 3 Drawing Sheets

Figure 1:
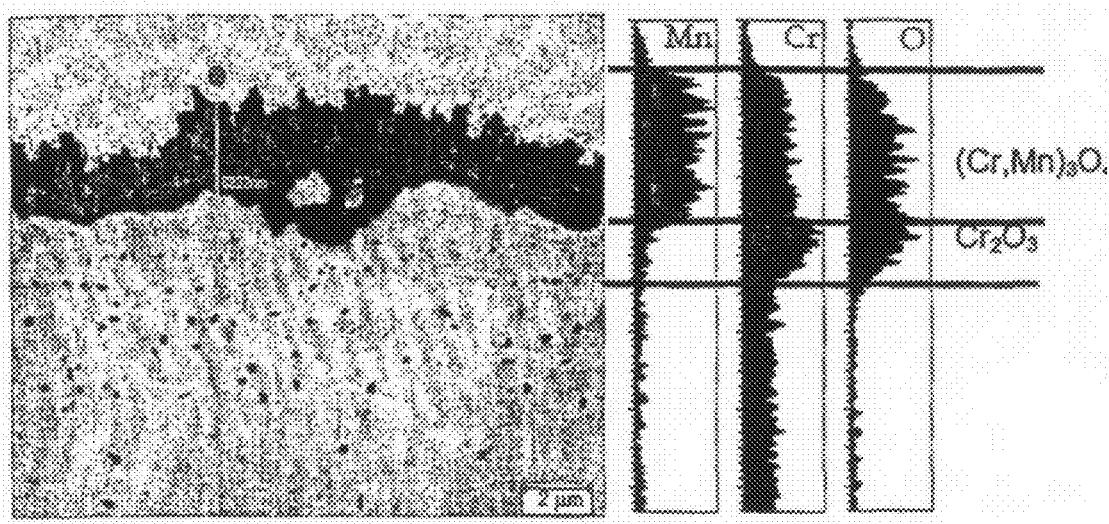

U.S. PATENT DOCUMENTS 6,824,883 B1 * 11/2004 Benum et al. .............. 428/469

6,936,217 B2 * 8/2005 Quadadakkers et al. ....... 420/40

* cited by examiner

PROTECTIVE COATING FOR SUBSTRATES THAT ARE SUBJECTED TO HIGH TEMPERATURES AND METHOD FOR PRODUCING SAID COATING

CROSS REFERENCE TO RELATED APPLICATIONS

This application is the US national phase of PCT application PCT/DE2004/000024 filed 13 Jan. 2004 with a claim to the priority of German patent application 10306649.7 itself filed 18 Feb. 2003.

The invention relates to a protective coating for substrates subject to high temperature loading, especially for interconnectors for high temperature fuel cells, as well as to a method for making such a coating.

STATE OF THE ART

A high temperature fuel cell (solid oxide fuel cell—SOFC) enables direct conversion of chemical energy into electrical energy. The fuel ($H_2$, $CH_4$, CO, etc.) is passed separately from an oxidizing agent ($O_2$, air) through an oxygen conducting solid electrolyte (yttrium-stabilized $ZrO_2$). At an operating temperature of the cell of about 600 to 1000° C., oxygen ions are conducted from the cathode side through the electrolyte to react with the fuel at the anode. The electrolyte is coated with porous catalytically effective electrode material. In general, the anode (fuel side) is comprised of an Ni/$ZrO_2$ cermet, the cathode (oxygen side) of a perovskite on an $LaMnO_3$ basis.

To enable the SOFC technique to be used to generate electric current, several cells must be connected together. For that purpose, a further cell component is necessary, namely, the bipolar plate which can also be referred to as an interconnector. By contrast with the electrolyte and the electrodes, which may be 100 μm thick and thus of a different order or magnitude, the bipolar plates in the SOFC flat cell concepts that are most common today have a thickness of a half mm to a several mm and thus form not only the gas conducting connecting body between the individual cells but also the supporting component of the cells (EP 0 338 823 A1). Interconnectors for high temperature fuel cells and the methods of making them are sufficiently known from the literature.

A significant characteristic or property which an interconnector alloy must demonstrate is a high resistance to oxidation in the anode and cathode gases at operating temperature. In addition, the interconnector alloy must have a thermal coefficient of expansion which is relatively low for metals (about $10 \times 10^{-6}$ $K^{-1}$ to $13 \times 10^{-6}$ $K^{-1}$) to have thermophysical compatability with the ceramic cell components. The exact thermal expansion coefficient depends upon the respective cell concept, that is with fuel cells with an anode substrate as the mechanically supporting component, in general, there will be a somewhat higher expansion coefficient required with cell concepts in which an electrolyte foil constitutes a supporting component. The desired characteristic or property combination for interconnector materials can in principle be satisfied by chromium-oxide-forming high temperature materials. This group of materials forms at the typical SOFC operating temperatures an oxidic cover layer of a chromium oxide base which protects the material from rapid degradation by oxidation. The usual chromium oxide forming materials (based upon NiCr, NiFeCr or CoCr) are, however, not suitable for use in high temperature fuel since they show significant higher thermal expansion coefficients than the usual ceramic components of the cell. As a consequence, especially for the flat cell concepts of high temperature fuel cells two groups of chromium oxide forming materials are used as interconnector materials: chromium based alloys or chromium-rich alloys based upon iron (ferritic steels).

At higher temperatures (about 300 to 1200° C.) the chromium oxide layer reacts with oxygen and $H_2O$ to chromium trioxide ($CrO_3$) and/or chromium oxide hydroxide ($CrO_2(OH)_2$, $CrO(OH)_4$), which because of their high vapor pressures at these temperatures can be transported through the gas space to the cathode or to the interface between electrolyte and cathode. There these Cr(VI) compounds react with the cathode material and contribute to a catalytic limitation of the oxygen reduction during fuel cell operation. This process leads to a reduction in the power output and life of the fuel cell.

To reduce the chromium evaporation, heretofore, various processes have been proposed or used. For example, a process has been described in the literature in which the surface of the interconnectors has been coated with an aluminum rich layer. Nevertheless, the contact surfaces between the electrode and interconnector must remain free of the aluminum, since otherwise an excessively high resistance will be established. The effect of the chromium evaporation then arises with a delay but is not precluded.

In an improvement in the method, the additional coating of the contact surfaces with nickel, cobalt or iron can be undertaken so that the spinel layer which is formed under the operating conditions can have a (Cr, Ni)-spinel, (Cr,Co)-spinel or (Cr—Fe)-spinel composition which additionally suppresses the chromium evaporation.

A further variant comprises the coating of interconnectors with lanthanum containing coatings ($LaCrO_3$, $La_2O_3$, $LaB_6$). Either the $LaCrO_3$ layer is directly applied or the chromium oxide which is formed is permitted to react with the reactive lanthanum containing coating during operation to $LaCrO_3$. It has, however, been indicated in the literature that microcracks in an $LaCrO_3$ coating do not heal and thus cannot insure a sufficient protection against chromium evaporation.

An entirely similar solution for producing a protective coating is either the use of steels which contain elements like, for example, manganese, nickel or cobalt which together with chromium form spinel coatings under oxidizing conditions, or the application or manganese containing layers which, by reaction with chromium oxide also lead to spinel coatings. The formation of these chromium spinel structures lead to a detectable reduction in chromium (Ch. Gindorf, L. Singheiser, K. Hilpert, Steel Research 72 (2001) 528-533). This is, however, not sufficient to insure a satisfactorily high power and long life of the fuel cell since there is always some chromium diffusion through the chromium-containing spinel coating. In addition, the spinel phase itself has a Cr-(VI) oxide or Cr(VI)-hydroxide vapor pressure because of its high chromium content. As a result, chromium-(VI) oxide and chromium oxide-hydroxide compounds can be liberated.

OBJECTS AND SOLUTION

The object of the invention is to provide a gas tight and chromium free protective coating for a chromium oxide forming substrate which at elevated temperatures prevents the evaporation of chromium from the substrate. Furthermore, it is an object of the invention to provide a method of producing such a protective coating.

The objects are achieved by a protective coating according to the main claim and a fabrication method according to the auxiliary claim. Advantageous embodiments of the protective layer and the method are found in the claims which depend therefrom.

SUBJECT MATTER OF THE INVENTION

In the framework of this invention, it has been found that a spinel coating encompassing on the one hand an element from the group of manganese, magnesium and vanadium and a further element from the group of cobalt, nickel, iron, copper and vanadium, advantageously forms a gas tight coating which, when arranged on a chromium oxide forming substrate, prevents a vaporization of chromium from the substrate even up to higher temperatures up to 1000° C.

Such a protective coating, as a rule, can be provided between a chromium oxide forming substrate, especially a metallic interconnector material and a further coating. The further coating encompasses at least one spinel forming element from the group of Fe, Co, Ni and Cu.

Typical chromium oxide forming substrates are, for example, metallic materials based upon Fe and/or Ni. As cover coat forming elements at the high operating temperatures of an SOFC (typically 600 to 1000° C.), the material can contain a significant proportion of chromium. The exact concentration can depend upon the respective material type. In chromium based alloys, the chromium content can vary between 60 weight percent and close to 100 weight percent. In standard high temperature construction materials on an Fe-, Ni- or FeNi-basis the chromium content can usually amount to 13 to 30 weight percent. For an interconnector application, heretofore, especially Cr-based or FeCr-based alloys are considered since NiCr based and FeNiCr based materials have too high thermal expansion coefficients by comparison to the ceramic SOFC materials.

The substance of the invention is that the substrate of a Cr basis or FeCr basis contains further metallic alloying elements like, for example, manganese, magnesium, vanadium. These elements amount to 0.1 to 5% by weight, preferably 0.3 to 1% by weight. These elements have the characteristics that at the operating temperatures of the fuel cell and in the presence of an oxidizing operating atmosphere they diffuse rapidly through the chromium layer formed on the substrate surface and thus are enriched in an oxidic form at the oxide/gas interface.

If the substrate prior to use in the SOFC is provided with an oxidic or metallic protective coating which is comprised of a spinel forming element like, for example, cobalt, nickel, iron or copper, the above mentioned alloying elements diffuse through the chromium (III) oxide coating to the surface of the substrate. In the applied protective coating, they react to form a new, dense and especially chromium-free layer which on its side, because of its gas-tightness, suppresses further liberation of chromium and thus prevents chromium evaporation. In this manner, a sublimation of the chromium toward the cathode and consequently a poisoning of the cathode or of the cathode/electrolyte interface by chromium is effectively blocked. In this connection, it can be observed that the formation of this chromium-free protective coating under oxidizing conditions and at the operating temperature is effected already after several hours. The chromium-free spinels are especially thermodynamically stable at the fuel cell operating temperature and have a sufficiently high electrical difficulty. They adhere well to the chromium oxide coating. The adhesion properties are good since the thermal expansion coefficients of both layers are comparable to one another.

By comparison to the other above mentioned protective techniques, the new invention has the following advantages which are decisive for the SOFC technique.

(a) the chromium free spinel coating is formed by reaction of at least one alloying element from the metal with an alloying element of the applied layer and thus is uniformly compact, gas tight and well adherent.

(b) microcracks which may arise during long term operation (for example induced by temperature cycling) in the chromium free are self healing since there is a sufficient reservoir of the reactive elements in the alloy and the applied layer.

(c) the outer layer can be applied by conventional simple coating processes (spray or printing processes) and do not themselves have to have a high density.

SPECIAL DESCRIPTION PART

In the following, the subject matter of the invention will be described in greater detail in conjunction with figures and examples which should not be considered as limiting the scope of the invention. The drawings show:

FIG. 1: a view of an oxide coating on an FeCr alloy having a manganese addition after standing at 800° C. for 1000 hours in air, as well as an element profile thereof, in accordance with the state of the art.

Figure 2:
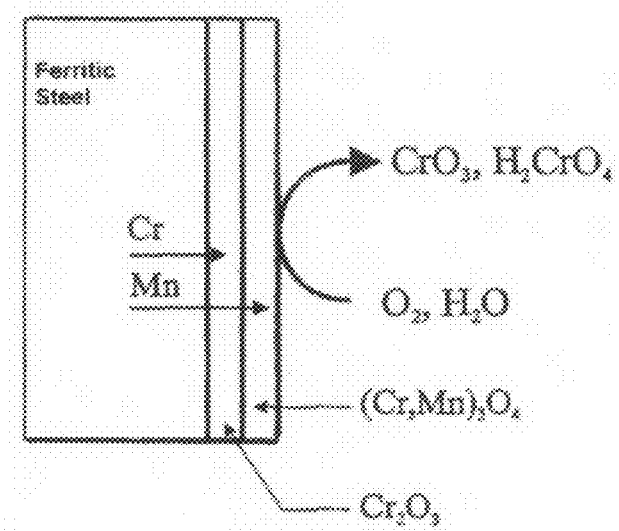

FIG. 2: a schematic illustration of a cathode side interconnector oxidation at the operating temperature of a high temperature fuel cell according to the state of the art.

Figure 3A:
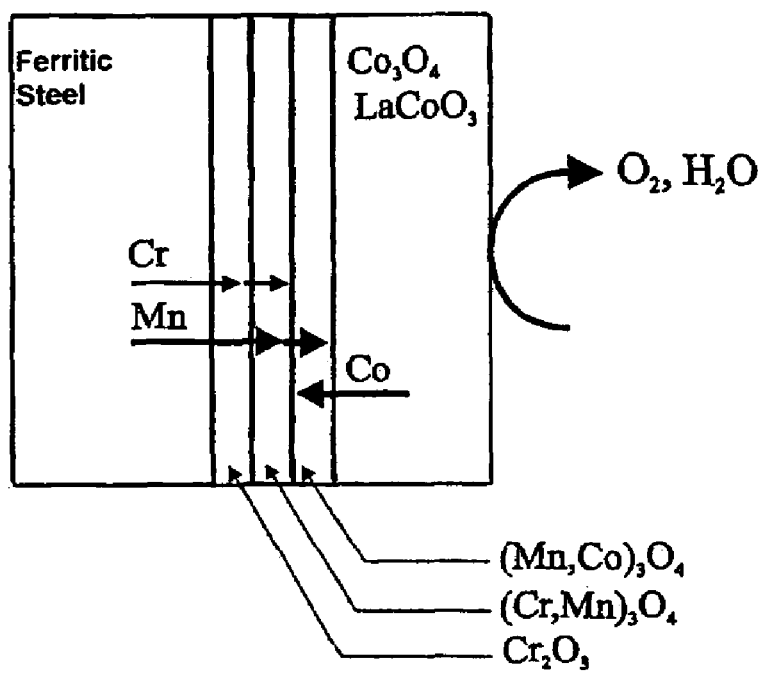

FIG. 3a: a schematic illustration of the formation of a gas-tight chromium-free protective coating on the interconnector at operating temperature of a high temperature fuel cell.

Figure 3B:
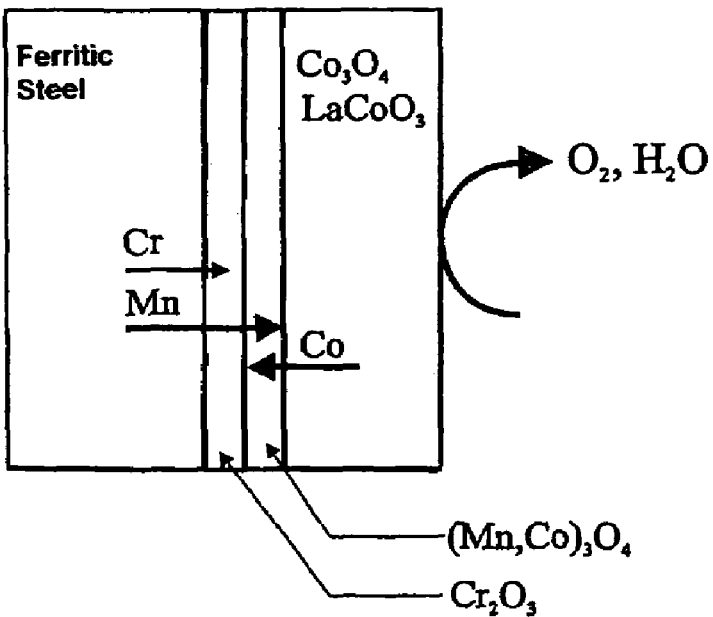

FIG. 3b: a schematic illustration of a gas-tight chromium-free protective coating on an interconnector at operating temperature of a high temperature fuel cell.

Figure 4:
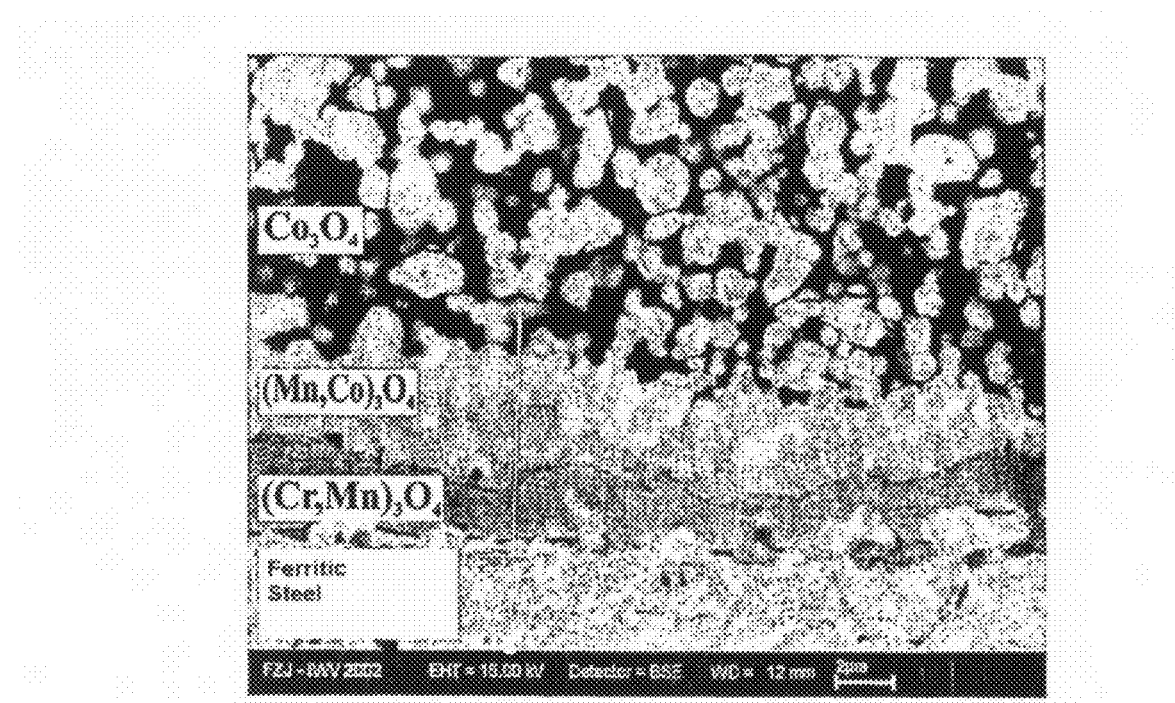
Figure 4:
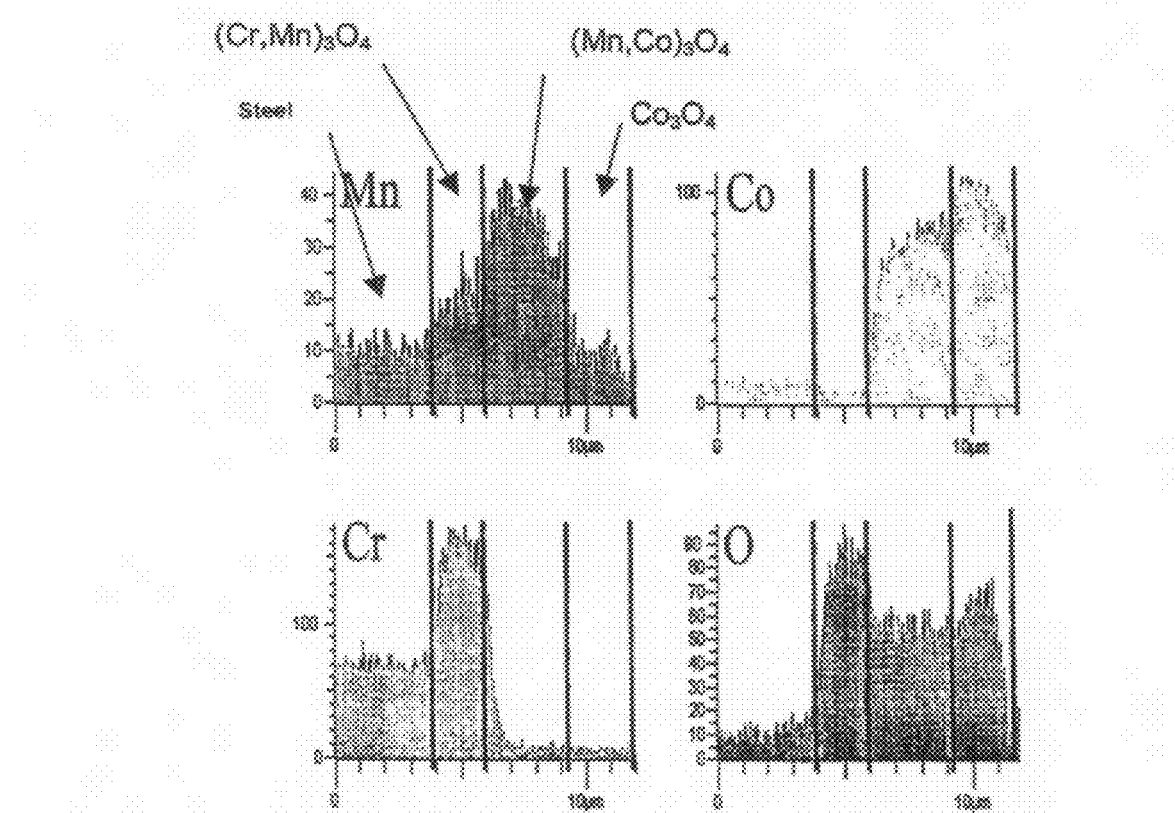

FIG. 4: a gas-tight chromium-free protective coating on a manganese containing steel which is coated with a $Co_3O_4$ layer and subjected to a temperature of 800° C. for 500 hours and the element profile associated therewith.

The photographic illustration of FIG. 1 shows the typical structure of the layer system according to the state of the art in which an FeCr alloy containing manganese is subjected to a temperature of 800° C. for 1000 hours in air. The associated element profiles for manganese, chromium and oxygen showing clearly a two layer structure on the steel: at the interface with the gas phase, a chromium/manganese mixed oxide layer ($(Cr, Mn)_3O_4$-layer) is formed which contains significant manganese and chromium as well as oxygen. In the layer lying therebeneath, which shows significantly less manganese, a typical chromium oxide layer ($Cr_2O_3$) is formed.

FIG. 2 shows schematically the cathode side interconnector corrosion at operating temperatures of a high temperature fuel cell as can occur customarily in accordance with the state of the art.

The cover layer formed by corrosion on the interconnector material is formed of $Cr_2O_3$ and $(Cr, Mn)_3O_4$ and liberates by further contact with $O_2$ and $H_2O$, volatile chromium (VI) oxide and chromium (VI) oxide hydroxide.

FIG. 3a: the schematic illustration of the formation of a chromium evaporation protective coating on the interconnector at the operating temperature of a high temperature fuel cell according to this invention. The chromium evaporation is protective coating ($(Mn, Co)_3O_4$) forms from the cobalt of the applied $Co_3O_4$ or $LaCoO_3$ layer and the manganese which diffuses outwardly through the inner chromium (III) oxide layer. This $(Mn, Co)_3O_4$ layer prevents the further chromium evaporation.

FIG. 3b: a schematic illustration of the formation of a chromium evaporation preventing coating on the interconnector at the operating temperature of the high temperature fuel cell. The protective layer preventing chromium evaporation formed directly from the cobalt of the applied $Co_3O_4$ layer or the $LaCoO_3$ layer and the manganese from the interconnector material.

FIG. 4: a corrosion coating of a manganese containing steel which is coated with $Co_3O_4$ and subjected to 800° C. for 500 hours. The element profile shows the formation of an (Mn and Co)$_3O_4$ layer. This protective layer is formed from the cobalt of the applied $Co_3O_4$ coating and the manganese which diffuses outwardly through the inner (Cr, Mn)$_3O_4$ layer.

EXAMPLES

1. An alloy was used according to DE 100 25 108 A1 with 23 weight percent Cr and 0.5 weight percent Mn. An outer coating of a cobalt oxide ($Co_3O_4$) was applied as a porous ceramic layer. After 500 hours at 800° C., a chromium free, low porosity spinel had been formed of the composition (Mn, Co)$_3O_4$ which was found by means of EDX analysis to be free from detectable amounts of chromium on the chromium oxide layer (FIG. 4). This spinel had a higher conductivity than the chromium (III) oxide layer. Since oxygen in the gas space was no longer in contact with the chromium oxide layer and resulted in a reduced rate of growth of the chromium oxide and thus provided protection against oxidation. No longer were chromium (VI) oxide and/or chromium (VI) hydroxide compounds formed by oxygen and water vapor so that cathode poisoning was prevented.

2. An alloy was used according to DE 100 25 108 A1 with 23 weight percent chromium and 0.5 weight percent manganese. As an outer coating, a lanthanum cobalt oxide ($LaCoO_3$) was applied as a porous ceramic layer. After 500 hours at 800° C. a chromium free gas tight spinel was also formed with the composition (Mn, Co)$_3O_4$.

The invention claimed is:

1. A method of producing a protective layer on a substrate with the steps of:
   (a) applying on the chromium-oxide-forming substrate having at least one alloying addition selected from the group consisting of manganese, magnesium, and vanadium, a coating consisting essentially of at least one spinel-forming element selected from the group consisting of cobalt, nickel, copper and vanadium,
   (b) forming a chromium oxide layer at the substrate/applied coating interface,
   c) at a temperature of 500° C. to 1000° C. causing the diffusion of the at least one alloying addition through the chromium oxide layer and forming a compound thereof with the least one spinel-forming element diffusing from the applied coating and forming between the chromium oxide layer on the substrate and the applied coating, a uniform, compact, adherent chromium-free gas-tight spinel layer, said alloying addition and said applied coating containing sufficient reservoirs of said alloying addition and said spinel-forming element, respectively to heal any microcracks in the chromium-free spinel layer which forms during operation of a high temperature fuel cell.

2. The method according to claim 1 in which the applied coating is applied in the form of monoxides as a suspension or slurry by wet powder spraying, painting or screen printing on the chromium-oxide-forming substrate.

3. The method according to claim 1 in which the applied coating is applied in the form of CoO and CuO to the chromium-oxide-forming substrate.

4. The method according to claim 1 in which manganese as alloying addition from the substrate and cobalt as spinel-forming element from the applied coating form the chromium-free gas tight spinel layer according to the formula $Co_{3-x-y}M_xMn_yO_4$ where M=Ti, V, Mn, Fe, Ni, Cu; x<0.4 and 0<y<1.5.

5. The method according to claim 1 in which manganese as the alloying addition of the substrate and cobalt and copper as the spinel-forming elements from the applied coating form the chromium-free gas-tight spinel layer according to the formula $Co_{3-x-y}Cu_xMn_yO_4$ where O<x<1.5; O<y<3 and (x+y)<3.

6. An interconnector in a high temperature fuel cell with a protective layer produced in accordance with the method according to claim 1 comprising
   a chromium-oxide-forming substrate with at least one alloying addition selected from the group consisting of manganese, magnesium, and vanadium, which has a chromium-oxide surface,
   a coating applied thereon consisting essentially of a spinel-forming element selected from the group consisting of cobalt, nickel, copper and vanadium, and
   wherein between the chromium oxide layer of the substrate and the applied coating, a uniform, compact, adherent chromium-free gas-tight spinel layer is formed which has at least one alloying addition from the substrate and a spinel-forming element from the applied coating, said alloying addition and said applied coating containing sufficient reservoirs of said alloying addition and said spinel-forming element, respectively to heal any microcracks in the chromium-free spinel layer which forms during operation of a high temperature fuel cell.

7. An interconnector according to claim 6 in which the applied coating is present as a metallic coating.

8. The interconnector according to claim 6 in which the applied coating is present as an oxidic ceramic.

9. The interconnector according to claim 8 in which the oxidic ceramic is a binary transition metal oxide selected from the group consisting of $V_2O_5$, $Co_3O_4$ and CuO.

10. An interconnector according to claim 8 in which the oxide ceramic is present as a complex oxide, either as a perovskite or as a spinel with cobalt.

11. An interconnector according to claim 8 in which the oxidic ceramic is $LaCo_{1-x}M_xO_3$ where M=Ti, V, Mn, Fe, Ni, Cu; x<0.4 and O<y <1.5.

12. The interconnector according to claim 6 wherein the chromium oxide forming substrate comprises 23 weight percent chromium, the alloying addition to the chromium oxide forming substrate is 0.5 weight percent Mn, the spinel-forming element is Co applied to the chromium oxide forming substrate as $Co_3O_4$, and the chromium-free spinel layer composition is (Mn, Co)$_3O_4$.

13. The interconnector according to claim 6 wherein the chromium oxide forming substrate comprises 23 weight percent chromium, the alloying addition to the chromium oxide forming substrate is 0.5 weight percent Mn, the spinel-forming oxidic ceramic is $LaCoO_3$, and the chromium-free spinel layer composition is (Mn, Co)$_3O_4$.

* * * * *